(12) United States Patent
Paul

(10) Patent No.: US 6,611,745 B1
(45) Date of Patent: Aug. 26, 2003

(54) STEERING SYSTEM AND STEERING METHOD

(75) Inventor: Andreas Paul, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 10/009,251

(22) PCT Filed: May 15, 2000

(86) PCT No.: PCT/EP00/04345

§ 371 (c)(1),
(2), (4) Date: Nov. 25, 2001

(87) PCT Pub. No.: WO00/71404

PCT Pub. Date: Nov. 30, 2000

(30) Foreign Application Priority Data

May 20, 1999 (DE) .......................................... 199 23 012

(51) Int. Cl.⁷ ................................................ G06F 7/00
(52) U.S. Cl. .......................... 701/41; 180/422; 180/446; 303/165
(58) Field of Search .............................. 701/41, 84, 87; 303/141, 148, 163, 165; 180/422, 443, 446

(56) References Cited

U.S. PATENT DOCUMENTS

| | | | |
|---|---|---|---|
| 4,758,053 A | * | 7/1988 | Yasuno ........................ 303/165 |
| 5,636,909 A | * | 6/1997 | Hirao et al. .................. 303/140 |
| 5,729,107 A | | 3/1998 | Shimizu et al. .............. 318/489 |
| 5,735,584 A | * | 4/1998 | Eckert .......................... 303/140 |
| 5,828,972 A | | 10/1998 | Asanuma et al. ............... 701/41 |
| 6,015,193 A | | 1/2000 | Vogel et al. .................. 303/147 |

FOREIGN PATENT DOCUMENTS

| | | | |
|---|---|---|---|
| DE | 38 37 864 A1 | 5/1990 | ............ B62D/6/00 |
| DE | 42 39 831 A1 | 6/1993 | ............ B62D/6/00 |
| DE | 42 00 997 A1 | 7/1993 | ............ B60T/8/00 |
| DE | 195 26 250 A1 | 1/1997 | ............ B60T/8/60 |
| DE | 694 02 278 T2 | 7/1997 | ............ G05D/1/02 |
| DE | 196 32 251 A1 | 2/1998 | ............ B60T/8/62 |
| DE | 196 50 475 C1 | 4/1998 | ............ B62D/6/00 |
| DE | 196 50 691 C2 | 10/1998 | ............ B62D/6/00 |
| EP | 0 473 112 A2 | 3/1992 | ............ B62D/7/15 |
| EP | 0 718 173 A2 | 6/1996 | ............ B62D/6/00 |

* cited by examiner

Primary Examiner—Gertrude Arthur
(74) Attorney, Agent, or Firm—Davis & Bujold, P.L.L.C.

(57) ABSTRACT

The invention relates to relates a steering system and to a steering method which counteract a mistake that inexperienced drivers frequently make. The invention relates to a system (12, 14, 6) for determining the transversal slip that occurs at the steerable wheels (2). A electronic control system (6) is used to determine an upper threshold value for said transversal slip. If the transversal slip exceeds said threshold value, an augmentation of the angle of lock is counteracted by either limiting said angle of lock and/or outputting a warning signal that can be perceived by the driver.

20 Claims, 1 Drawing Sheet

STEERING SYSTEM AND STEERING METHOD

Figure 1:
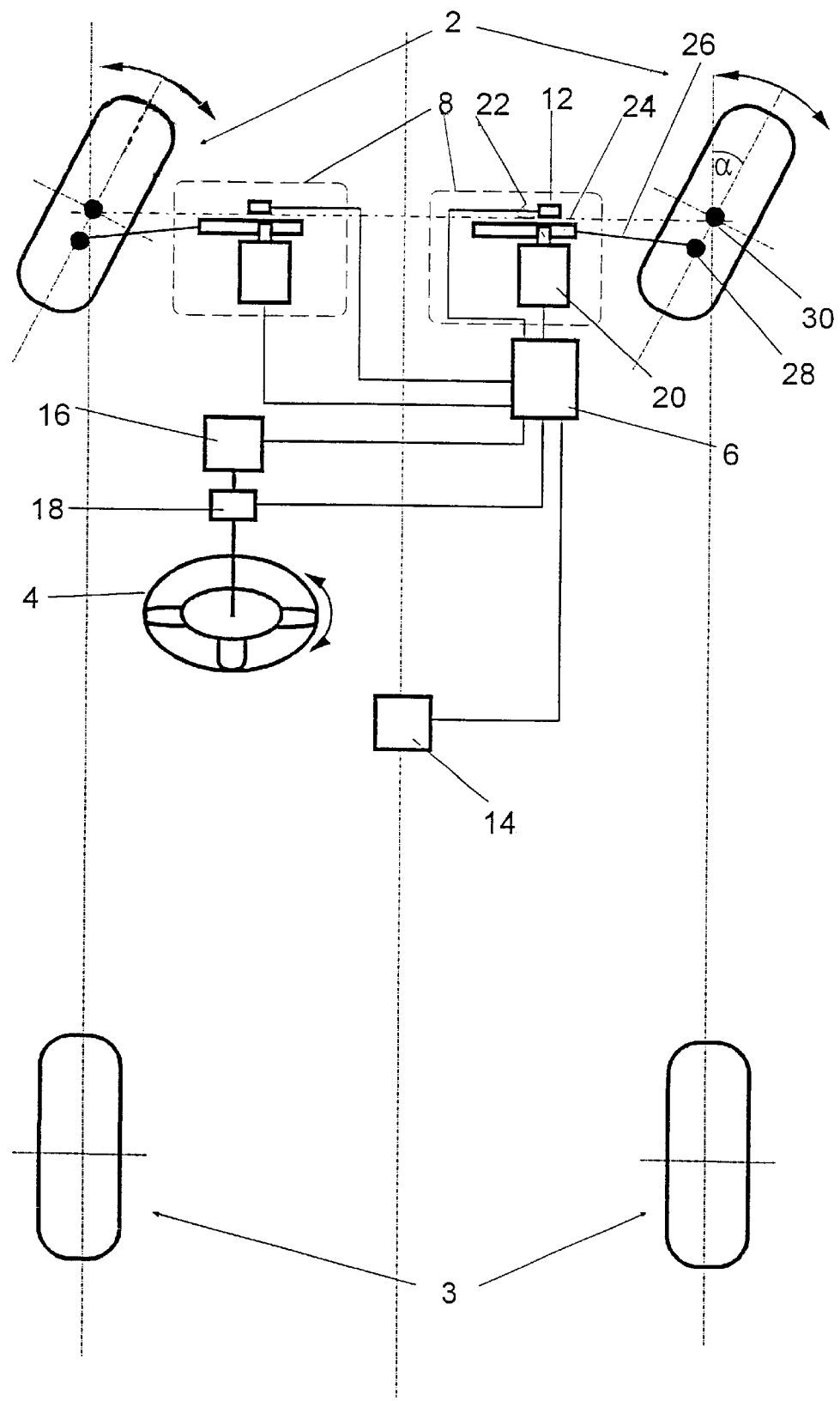

According to the preamble of the main claim, the invention relates to a steering system for a motor vehicle and to a method for operating the steering system.

A steering system for a motor vehicle with steerable wheels has in many cases, together with a steering organ actuatable by the driver, an actuator for the angle of lock of the steerable wheels. Electrical or hydraulic servo-assisted devices parallel to a mechanical transmission device are used as actuators or as exclusive actuators in so-called "steer-by-wire" systems.

Such a "steer-by-wire" system usually comprises also an electronic control device and has been disclosed, for ex., in DE-OS 196 32 251.

Most modern vehicles are undermodulatedly designed in the curve limit range. When approaching the curve limit range there first occurs on the steered front wheels a transversal slip so that the vehicle moves and decelerates via the front wheels. One other steering angle leads only to too reinforced deceleration but with diminishing transversal acceleration. An experienced driver recognizes the undermodulation and steers only as far as the existing driving situation allows.

However, many inexperienced drivers react erroneously in such a situation. Wishing to evade an obstacle, for example, they continue to steer further with the result that even though the vehicle decelerates, it does not follow the desired curve radius. This mistaken reaction is specially critical in case of changing road condition: if fully steering in the way described, for ex., on even road and the front wheels finding a non-skidding road section suddenly stop again, the vehicle can run out of control.

The problem on which the invention is based is to provide a steering system and a steering method which assist even inexperienced drivers in avoiding the mistaken reaction described.

The problem is solved by a steering system having the features of the main claim and a steering method for operating the steering system according to the first method claim. Features of the sub-claims give advantageous developments.

According to the invention a device is provided for determining a transversal slip occurring on the steerable wheels. In the electronic control device can be determined an upper threshold value for the transversal slip which is compared with the value of the transversal slip determined. There is provided at least one means which serves to counteract a further enlargement of the angle of lock when the transversal slip determined is greater than the upper threshold value. As standard for the occurring transversal slip can be used, for example, the oblique transit angle. In the electronic control device this can be calculated from the signal, anyway existing in vehicles having electronic driving dynamics, of a yawing rate sensor, of wheel position sensors and of the vehicle speed. The threshold value for the transversal slip is in the simplest case a presettable fixed value stored in the electronic control device. But it is also possible to determine dynamically the threshold value according to driving state parameters like speed. If the actually occurring transversal slip or the oblique transit angle is larger than the upper threshold value, it is concluded that the driver has mistakenly reacted by steering too far. For this case at least one means is provided which serves to counteract a further enlargement of the angle of lock. It is convenient to this case that the driver be assisted in avoiding his mistaken reaction whereby the driving safety is increased.

Too large an angle of lock can reliably be prevented if the means which counteracts a further enlargement of the angle of lock is the actuator of the angle of lock, the electronic control device upwardly limiting the regulating distance of the actuator.

A less strong engagement in the steering function results when there is provided a warning signal generator controlled by the electronic control device and that generates a warning signal perceivable by the driver when the transversal slip determined is larger than the upper threshold value.

In steering systems without mechanical connection between steering organ and actuator, there is usually provided a steering actuator (wheel) which generates the steering force perceivable by the driver. It is convenient to use the steering actuator (wheel) as warning signal generator. Hereby is made possible a steering method in which the steering organ actuator produces an increased steering force when the transversal slip detected is greater than the upper threshold value. The driver senses a very clear feedback when the steering force generated increases suddenly by a presettable amount upon exceeding the upper threshold value. Alternatively or additionally to increased steering force the steering organ actuator can produce a vibration of the steering organ. Similarly to an ABS deceleration where the brake pedal vibrates, a vibrating steering wheel makes the driver aware that he is in a limit range of tire adhesiveness. The different warning signals can obviously be combined with each other or other warning signal generators which operate acoustically or optically can also be used.

The invention is described in detail hereunder with reference to the enclosed FIGURE.

In the diagrammatic representation, with 2 are designated the steerable front wheels of a vehicle and with 3 the rear wheels. The steering system shown is a so-called "steer-by-wire" steering without mechanical coupling of steering organ 4 and the steerable wheels 2. The steering position of the steering organ, which is designed as steering wheel 4, is detected by the steering angle sensor 18. The latter's output signal is passed to the electronic control device 6. From the latter results the control of the actuators 8 for the angle of lock a of the steerable wheels. In the embodiment shown one actuator 8 is provided for each steerable front wheel 2. Each actuator 8 has a servomotor 20 which drives an axially movable rack 24 via a pinion 22. The axial motion of the rack 24 is transmitted via a rod 26 to a pivot 28 of the wheel suspension which is spaced from the axis of rotation 30 determinant of the steering motion. It is obvious that the other known configurations of actuators can basically be used for the invention.

The sensor 12 comprises the regulated position of the actuator. The output signal is led back to the electronic control device 6 so that it is possible there to determine the wheel angle of lock or to conduct a regulation of the wheel angle of lock.

The steering organ actuator 16 is likewise controlled by the electronic control device and is in operative connection with the steering wheel 4. The steering organ actuator 16 generates the steering force to be overcome by the driver or the steering torque outcropping on the steering wheel. Finally, with 14 is in addition designated also a yawing rate sensor whose output signal is also passed to the electronic control device 6. The yawing rate sensor 14 serves to determine the transversal slip occurring on the steerable wheels 2 or the oblique transit angle appearing there. From the wheel angle of lock a, which is determined with the position sensor 12, and the vehicle speed it is possible to determine the yawing rate of the vehicle when no transversal slip occurs on the steerable wheels 2. If the yawing rate so determined is lower than the yawing rate measured with the sensor 14, it can be concluded in an underrmodulatedly designed vehicle that a transversal slip occurs in the front wheels. The difference of both value is a standard for the transversal slip or for the oblique transit angle.

Likewise applicable to the invention is any other possibility of accurately enough determining the transversal slip on the steerable wheels such as the optical sensors oriented to the road.

In the driving operation the actually occurring transversal slip or the actually occurring oblique transit angle is continuously determined and compared to the electronic control device with the upper threshold value for the transversal slip which can be preset or determined according to certain driving state parameters. As long as the actual transversal slip is smaller than the threshold value, the steering system operates in the manner known per se. But if the upper threshold value is exceed, it is concluded that an undesired mistaken behavior of the driver exists and means are used which serve to counteract a further enlargement of the angle of lock.

In a development of the invention, the regulating distance of the actuator 8 is directly upwardly limited. This can be done, for ex., by a control so that the wheel angle of lock be reduced until the actual transversal slip again is smaller that the upper threshold value. As soon as this is the case, an enlargement of the angle of lock is again allowed if the driver still desires it. A control oscillation by the wheel angle of lock in which the occurring transversal slip is equal to the upper threshold value with relatively less amplitude can absolutely be desired if thereby at least the "saw cutting" practiced by the racing motorist is simulated on the steering wheel. The steering organ actuator 16 can here imprint on the steering wheel 4 a movement corresponding to the change of wheel angle of lock. But since to this end considerable forces are needed which under certain circumstances also would not be accepted by the driver, it is convenient to uncouple to a certain extent the motion of the actuator 8 or of the actuators from the motion of the steering wheel. By an increased steering force and/or a vibration of the steering wheel the driver can be haptically made aware that the steering angle limitation is active.

This variant also provides that the mistaken behavior of the driver be corrected whereat the driver then can receive only one feedback. The second variant in which only one warning signal is transmitted to the driver when exceeding the upper threshold value for the transversal slip includes the driver in the control circuit. The angle of lock is not directly limited by control of the actuators. The driver is rather given by the warning signal an indication of again reducing the angle of lock by actuating the steering organ 4.

The steering method described is specially suited for "steer-by-wire" systems. The invention can also be used in conventional, servoassisted hydraulic or electrical steering transmissions with rigid mechanical connection between steering organ and steerable wheels. Even though no uncoupling of the motion of steering wheel and steered wheels is possible here, it is nevertheless possible to generate a warning signal perceivable by the driver. The servoassistance, for ex., can be reduced when exceeding the upper threshold value by an adequate engagement in the hydraulic or electrical control.

In the steering system shown, one actuator 8 is provided for each steerable wheel 2. So far as the transversal slip is individually determined for each steered wheel, it is possible upwardly to limit individually the regulating distance of each actuator when the transversal slip determined on the respective wheel is greater than the upper threshold value. This is also specially advantageous when the upper threshold value for the transversal slip is determined according to the actual braking state or the actual longitudinal slip. In this case with a higher longitudinal speed, higher threshold values are associated for the transversal slip in order to ensure steerability of the vehicle also when full brakes are applied.

REFERENCE NUMERALS 2 steerable wheels
3 rear wheels
4 steering wheel
6 electronic control device
8 actuator
12 sensor
14 yawing rate sensor
16 steering organ actuator
18 steering angle sensor
20 servomotor
22 pinion
24 rack
26 rod
28 pivot
30 axis of rotation

What is claimed is:

1. A steering system for an undermodulatedly designed motor vehicle with two steerable wheels (2), a steering wheel (4) actuatable by a driver of the vehicle against one of a steering force action and a steering torque, at least one actuator (8) for an angle of lock of the two steerable wheels, and the at least one actuator (8) acting upon the two steerable wheels (2) and being modulatable by an electronic control device (6);

wherein a device (12, 14, 6) determines a transversal slip occurring on the steerable wheels (2), the electronic control device (6) determines an upper threshold value for the transversal slip, and at least one means (16, 8) is provided which serves to counteract further enlargement of the angle of lock when the determined transversal slip is greater that the upper threshold value.

2. The steering system according to claim 1, wherein the at least one means which counteracts the further enlargement of the angle of lock is the at least one actuator (8) for the angle of lock, the electronic control device (6) limits upwardly a regulating distance of the at least one actuator (8) when the determined transversal slip is larger than the upper threshold value.

3. The steering system according to claim 2, wherein the transversal slip is individually determined for each steered wheel, each steered wheel is actuated by a separate actuator and the electronic control device (6) individually upwardly limits a regulating distance of each actuator when the determined transversal slip on the respective wheel is larger that the upper threshold value.

4. The steering system according to claim 1, wherein the at least one means which counteracts the further enlargement of the angle of lock is a warning signal generator (16), and the warning signal generator (16) is controlled by the electronic control device (6) and generates a warning signal perceivable by the driver of the vehicle when the determined transversal slip is larger that the upper threshold.

5. The steering system according to claim 4, wherein the warning signal generator (16) is a steering wheel actuator which, in a steering system without a mechanical connection between steering wheel (4) and the at least one actuator (8), procures the steering force for the driver of the vehicle.

6. The steering system according to claim 5, wherein the steering wheel actuator (16) generates an increased steering force when the determined transversal slip is greater than the upper threshold value.

7. The steering system according to claim 6, wherein, when the upper threshold value is exceeded, the steering force generated is increased by an presettable amount.

8. The steering system according to claim 5, wherein the steering wheel actuator generates vibration of the steering wheel (4) when the determined transversal slip is larger than the upper threshold value.

9. The steering system according to claim 1, wherein the upper threshold value for the transversal slip is determined according to an actual braking state, and higher threshold values for the transversal slip are associated with higher longitudinal slip.

10. The steering system according to claim 1, wherein two actuators (8) for the angle of lock are provided and each one of the two actuator (8) for the angle of lock is coupled to one of the two steerable wheels (2).

11. The steering system according to claim 10, wherein each one of the two actuators (8) for the angle of lock comprises a servomotor and a sensor, and the servomotor is connected to one of the two steerable wheels (2) by a coupling.

12. A steering system for an undermodulatedly designed motor vehicle with two steerable wheels (2), a steering wheel (4) actuatable by a driver of the vehicle against one of a steering force action and a steering torque, at least one actuator (8) for an angle of lock of the two steerable wheels, and the at least one actuator (8) acting upon the two steerable wheels (2) and being modulatable by an electronic control device (6);

wherein a device (12, 14, 6) determines a transversal slip occurring on the steerable wheels (2), the electronic control device (6) determines an upper threshold value for the transversal slip, and at least one mechanism (16, 8) is provided for counteracting further enlargement of the angle of lock when the determined transversal slip is greater that the upper threshold value.

13. The steering system according to claim 12, wherein the at least one mechanism for counteracting further enlargement of the angle of lock is the at least one actuator (8) for the angle of lock, the electronic control device (6) limits upwardly a regulating distance of the at least one actuator (8) when the determined transversal slip is larger than the upper threshold value.

14. The steering system according to claim 13, wherein the transversal slip is individually determined for each steered wheel, each steered wheel is actuated by a separate actuator and the electronic control device (6) individually upwardly limits a regulating distance of each actuator when the determined transversal slip on the respective wheel is larger that the upper threshold value.

15. The steering system according to claim 12, wherein the at least one mechanism for counteracting further enlargement of the angle of lock is a warning signal generator (16), and the warning signal generator (16) is controlled by the electronic control device (6) and generates a warning signal perceivable by the driver of the vehicle when the determined transversal slip is larger that the upper threshold value.

16. The steering system according to claim 5, wherein the warning signal generator (16) is a steering wheel actuator which, in a steering system without a mechanical connection between steering wheel (4) and the at least one actuator (8), procures the steering force for the driver of the vehicle.

17. The steering system according to claim 16, wherein the steering wheel actuator (16) generates an increased steering force when the determined transversal slip is greater than the upper threshold value.

18. The steering system according to claim 17, wherein, when the upper threshold value is exceeded, the steering force generated is increased by an presettable amount.

19. The steering system according to claim 16, wherein the steering wheel actuator generates vibration of the steering wheel (4) when the determined transversal slip is larger than the upper threshold value.

20. The steering system according to claim 12, wherein the upper threshold value for the transversal slip is determined according to an actual braking state, and higher threshold values for the transversal slip are associated with higher longitudinal slip.

* * * * *